US005694682A

United States Patent [19]
Zuercher et al.

[11] Patent Number: 5,694,682
[45] Date of Patent: Dec. 9, 1997

[54] METHOD OF MANUFACTURING VALVE SYSTEM FOR CAPACITY CONTROL OF A SCREW COMPRESSOR

[75] Inventors: Jan A. Zuercher, Spanish Fort; John Q. Richardson, Daphne, both of Ala.; Arthur R. Legault, Suwance, Ga.

[73] Assignee: Coltec Industries Inc., New York, N.Y.

[21] Appl. No.: 706,301

[22] Filed: Aug. 30, 1996

Related U.S. Application Data

[62] Division of Ser. No. 346,244, Nov. 23, 1994, Pat. No. 5,556,271.
[51] Int. Cl.$^6$ ............................................. B23P 15/00
[52] U.S. Cl. ................... 29/888.023; 29/888.02; 418/201.2
[58] Field of Search ................ 29/888.023, 428; 418/201.2; 251/63; 417/440

[56] References Cited

U.S. PATENT DOCUMENTS

| | | |
|---|---|---|
| 2,778,598 | 1/1957 | Bolling, Jr. |
| 3,452,935 | 7/1969 | Herold |
| 4,014,510 | 3/1977 | Smith |
| 4,227,380 | 10/1980 | Laucks et al. |
| 4,435,139 | 3/1984 | Astberg |
| 4,453,900 | 6/1984 | Schibbye et al. |
| 4,498,849 | 2/1985 | Schibbye et al. |
| 4,579,513 | 4/1986 | Zimmern et al. |
| 4,842,501 | 6/1989 | Schibbye et al. |
| 4,946,362 | 8/1990 | Soderlund et al. |
| 5,108,269 | 4/1992 | Glanvall |

FOREIGN PATENT DOCUMENTS

| | | |
|---|---|---|
| 59-131791 | 1/1983 | Japan |
| 5-18374 | 1/1993 | Japan |
| 8910489 | 11/1989 | WIPO |

Primary Examiner—Irene Cuda
Attorney, Agent, or Firm—Sixbey, Friedman, Leedom & Ferguson PC; Daniel W. Sixbey

[57] ABSTRACT

A lift valve communicating with a compression chamber of a variable capacity screw compressor is set forth including a valve housing, a piston reciprocally received within the valve housing, a shaft having a first end connected to the piston and a second end extending from the housing. The valve further includes a valve element connected to the second end of the shaft having a valve surface exposed to the compression chamber and a reciprocation mechanism for reciprocating the piston within the housing. The reciprocation mechanism includes a first pressure passage communicating with the housing adjacent a side of the piston, and a second pressure passage communicating with the housing adjacent and opposed side of the piston, wherein the valve surface is positively displaced toward and away from the compression chamber of the variable capacity screw compressor in response to the application of fluid pressure to at least one of the first and second pressure passages to vary the capacity of the screw compressor. Further, the lift valve is manufactured integral with the manufacturing of the compression chamber of the variable capacity screw compressor. This manufacturing process includes securing at least one lift valve to a housing of the variable capacity screw compressor in an operating position. Once secured to the housing, the shaft and consequently the valve element is fully extended from the valve housing and maintained in such position thus simultaneously machining an inner surface of the compression chamber and the valve surface such that the valve surface forms a continuation of the inner wall of the compression chamber when the variable capacity screw compressor is operating at full capacity.

6 Claims, 6 Drawing Sheets

METHOD OF MANUFACTURING VALVE SYSTEM FOR CAPACITY CONTROL OF A SCREW COMPRESSOR

This is a Divisional application of Ser. No. 08/346,244, filed Nov. 23, 1994 now U.S. Pat. No. 5,556,271.

TECHNICAL FIELD OF THE INVENTION

The present invention relates to a valve system for controlling the capacity of a screw compressor. Particularly, the present invention is directed to double acting lift valves for controlling the capacity of a screw compressor as well as the manufacture of such double acting lift valves.

BACKGROUND OF THE INVENTION

Rotary screw compressors of the type set forth herein comprise two rotors mounted in a working space which is limited by two end walls and a barrel wall extending therebetween. The barrel wall necessarily takes the shape of two intersecting cylinders, each housing one of the rotors. Each rotor is provided with helically extending lobes and grooves which are intermeshed to form chevron shaped compression chambers. In these chambers, a gaseous fluid is displaced and compressed from an inlet channel to an outlet channel by way of the screw compressor. Each compression chamber during a filling phase communicates with the inlet, during a compression phase undergoes a continued reduction in volume and during a discharge phase commimicates with an outlet. A rotary screw compressor of this type is disclosed in U.S. Pat. No. 4,435,139.

Rotary screw compressors of this kind are often provided with valves for regulating the built-in volume ratio for the capacity of the compressor. When continuous regulation is required, slide valves are often used, however, as with other regulation needs, it is sufficient to use lift valves. Such lift valves are mounted in the barrel wall of the compressor or may be mounted in one of the end walls and in this regard, normally in the high pressure end wall.

Several solutions for controlling the capacity of screw compressors operating at a constant number of rotations have been proposed. One such solution is disclosed in U.S. Pat. No. 5,108,269 issued Apr. 28, 1992. This solution provides radially positioned valves in the side wall of the barrel with the valves being opened so as to communicate the particular compression chamber with either the inlet or outlet manifold. However, as will be discussed in greater detail hereinbelow, with such valves, compression losses due to leakage clearance valve and between the valves and the rotors are experienced to the extent that full capacity cannot be realized.

Of the above noted solutions, the use of conventional slide type valves which constitute a portion of the barrel of the compressor has the advantage of providing a wide control range and the possibility that at a constant working pressure ratio in the compressor a relatively constant built in pressure ratio within the greater part of the control range can be brought about by means of a suitable dimensioning of the axial discharge port. The main disadvantage of slide valves is that they are expensive to manufacture in that close tolerances and accurate centering are required. Further, the actuating system which is normally a hydraulic system is also relatively expensive and complicated.

Another solution is to use a rotary type valve wherein the valves are in communication with slots formed in the barrel through which gas is recirculated to suction to create at partial loads. This valve arrangement has the advantage of being less expensive to manufacture than conventional slide valve types, however, the capacity control is not as accurate as with slide valve arrangements. Further, built-in pressure ratio drops with decreasing loads are experienced. Moreover, leakage is obtained across the slots along the rotor bores, particularly at higher loads and at full loads. This shortcoming will be described in greater detail hereinbelow with respect to FIG. 7b. Accordingly, it has been determined that the use of lift valves achieves an economic balance between the need for accurate capacity control as well as the need for minimizing manufacturing costs and operating costs. Lift valves of this type have been known and permit successive compression nodes within the barrel to communicate with one another, thus, effectively reducing the capacity of the compressor. One such valve is disclosed in U.S. Pat. No. 4,453,900 issued Jun. 12, 1984. Further, such valves may communicate an overlying compression node with a recirculation passage which returns pressurized fluid to the suction side of the compressor. However, it is noted that the opening of the lift valve is directly dependent upon the compression spring as well as the internal pressure of the compressor. However, the actuation of such valves is unreliable due to friction, corrosion and other environmental factors which often degrade the positioning of this type of lift valve. Further, while the face of the valve element takes on the approximate shape of the barrel, the valve element is separately formed by casting or other process within predetermined tolerances. In order to economically manufacture such valve elements, the tolerances must be some what relaxed which may result in the leakage of pressurized fluid between compression chambers thereby degrading the efficiency of the compressor.

Clearly there is a need for an accurately controlled and inexpensively manufactured valve system for controlling the capacity of a oil flooded rotary screw type compressor. Such a valve system to include a plurality of serially positioned lift valves which may be readily manufactured within a zero tolerance, with each when opened reducing the capacity of the compressor a predetermined mount.

SUMMARY OF THE INVENTION

A primary object of the present invention is to overcome the aforementioned shortcomings associated with known valve systems.

Another object of the present invention is to provide a series of lift valves for effectively controlling the capacity of a screw compressor.

Yet another object of the present invention is to provide a series of double acting lift valves for accurately controlling the position of the lift valve and thus the capacity of a screw compressor.

A further object of the present invention is to ensure reliable operation of the double acting lift valves by providing a two way shaft seal about an exposed end of the valve for preventing leakage from the valve and oil leakage into such valve.

An even further object of the present invention is to provide a series of lift valves wherein operating losses due to leakage about the valve are minimized while assembly costs are reduced.

A further object of the present invention is to provide a series of double acting lift valves for controlling the capacity of a screw compressor wherein a surface of each valve which is exposed to a compression chamber of the screw compressor forms an effective continuation of a surface of the compression chamber of the screw compressor.

Yet another object of the present invention is to machine the surface of each valve simultaneously with the machining of the surface of the compression chamber of the screw compressor in order to reduce manufacturing cost as well as operating losses.

A further object of the present invention is to positively and accurately axially position the surface of each valve during the machining of the surface of the operating chamber of the screw compressor.

An even further object of the present invention is to maintain the radial positioning of the surface of each valve during the machining of the surface of the compression chamber as well as during the operation of the screw compressor.

Yet another object of the present invention is to provide a series of lift valves wherein each lift valve housing is a single cast unit thereby minimizing leakages associated with related valves and reducing assembly costs.

These as well as additional objects of the present invention are achieved by providing a series of lift valves communicating with a compression chamber of a variable capacity screw compressor with each valve including a valve housing, a piston reciprocally received within the valve housing, a shaft having a first end connected to the piston and a second end extending from the housing. Each valve further includes a valve element connected to the second end of the shaft having a valve surface exposed to the compression chamber and a reciprocation mechanism for reciprocating the piston within the housing. The reciprocation mechanism including a first pressure passage communicating with the housing adjacent a first side of the piston, and a second pressure passage communicating with the housing adjacent an opposed side of the piston, wherein the valve surface is positively displaced toward and away from the compression chamber of the variable capacity screw compressor in response to the application of fluid pressure to at least one of the first and second pressure passages to vary the capacity of the screw compressor.

Additionally, the lift valve is manufactured integral with the manufacturing of the compression chamber of the variable capacity screw compressor. This manufacturing process includes securing at least one lift valve to a barrel portion of the variable capacity screw compressor in an operating position. As mentioned above, the lift valve includes a valve housing, a shaft extending from and reciprocally received within the valve housing and a valve surface of a valve element secured to a remote end of the shaft. Once secured to the housing, the shaft and consequently the valve element is fully extended from the valve housing. The process further includes maintaining the shaft in the fully extended position, and simultaneously machining an inner surface of the compression chamber and the valve surface such that the valve surface forms a continuation of the inner wall of the compression chamber when the variable capacity screw compressor is operating at full capacity. In this manner, zero tolerance is evidenced between the valve structure and the surface of the compression chamber.

These as well as additional advantages of the present invention will become apparent from the following detailed description of the invention when read in light of the several figures.

DETAILED DESCRIPTION OF THE PREFERRED EMBODIMENTS

Figure 1:
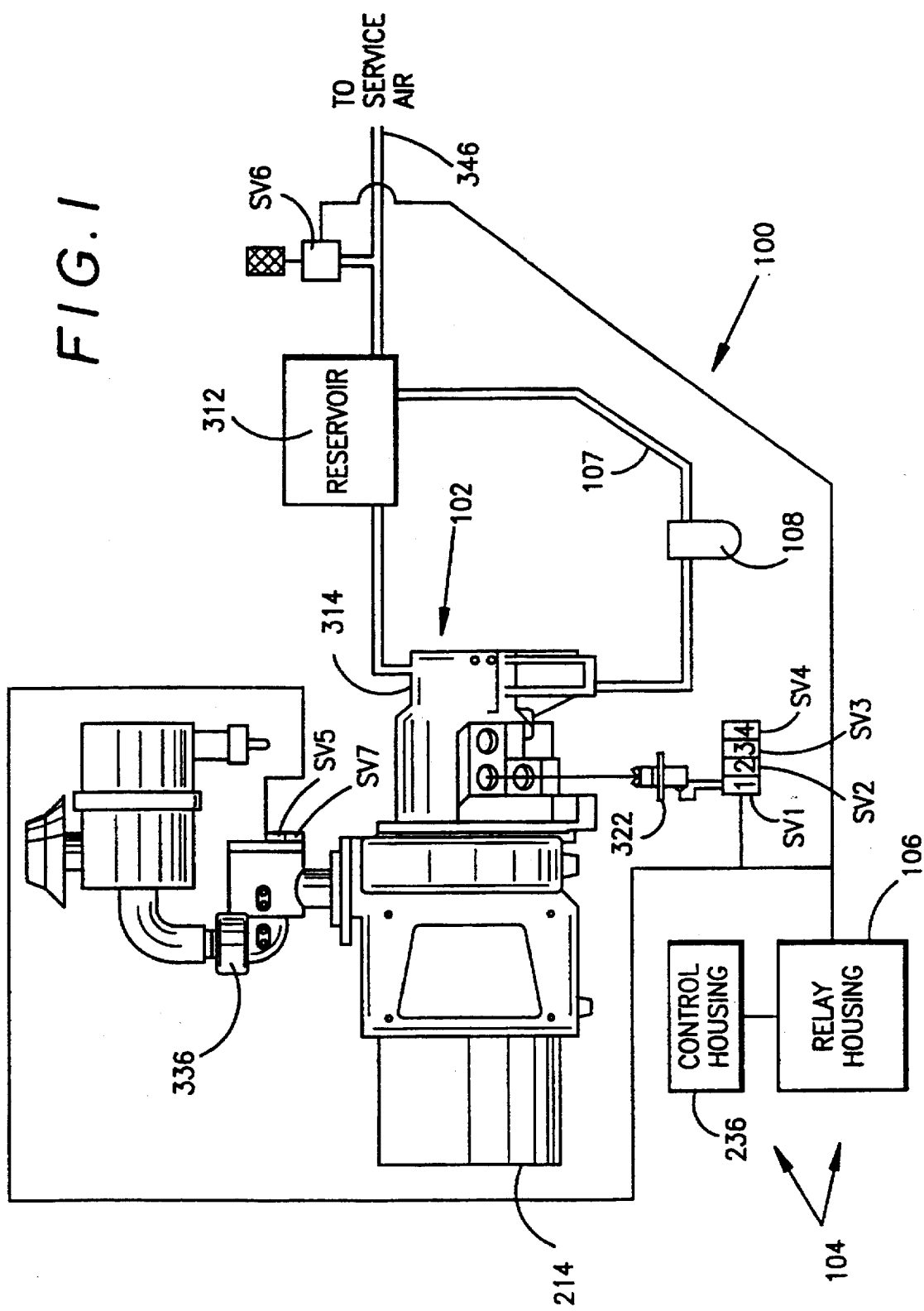
FIG. 1 is a diagrammatic view of the screw type compressor and supporting controls to which the present invention may be readily adapted.

The present invention relates to improved lift valves and improved methods for manufacturing such lift valves for rotary screw compressors. FIG. 1 is a diagrammatic view showing the compressor system 100 to which the present invention may be readily adapted. Compressor system 100 preferably includes an improved oil-flooded rotary screw compressor 102 and an electronic control system 104. In the preferred embodiment of the invention, the compressor 102 as well as the several capacity reduction lift valves 322 (only one illustrated) are controlled in accordance with the electronic control system described in a co-pending application entitled "System And Methods For Controlling Rotary Screw Compressors," naming Steven D. Centers and Paul Burrell as inventors, filed Nov. 23, 1994 and assigned to the same assignee as this application.

This related co-pending application is hereby incorporated in the present disclosure by reference, and constitutes the primary source of detailed disclosure of the electronic control system. However, those features of the control system that are most relevant to the operation of the present invention will be described briefly in enough detail to facilitate use of the inventive capacity reduction lift valves. Referring again to FIG. 1, compressor 102 is powered by an electric motor 214. Electronic control system 104 includes control housing 236 (containing the main electronic control components of the system), and relay housing 106 containing relays and switchgear for the system. Air end 314 of compressor 102 is connected to a air/lubricant reservoir 312, which provides air to service air output 346.

As referred to hereinabove, compressor 102 is provided with four capacity reduction lift valves. When actuated, each of these valves acts to effectively bypass a part of the compressor screw, reducing the capacity compressor 102 by approximately 12.5%. Thus, by opening one valve, a 12.5% reduction in output capacity is obtained, and by opening all four valves, capacity of the compressor is reduced by 50%. Intermediate levels of capacity of reduction, such as 25% and 37.5%, are similarly obtained by opening from one to four of the capacity reduction valves. For clarity, only one capacity reduction valve, valve 322, is shown in FIG. 1. Each of the capacity reduction valves is a positive double acting air operated valve, and each is controlled by a four way solenoid valve in response to signals from the electronic control system 104. The four way solenoid valves for controlling the four capacity reduction lift valves are designated in the drawing as SV1, SV2, SV3, and SV4.

Compressor 102 has an inlet valve 336 controllable to vary the amount of inlet air supplied to compressor 102. When inlet valve 336 is closed, no air is provided to compressor 102, so compressor 102 is "unloaded" and runs freely with minimal compression load. When inlet valve 336 is fully open, the compressor is "loaded" or provided with input air. Inlet valve 336 can also be controlled to open partially in a "modulated" operating mode, so that compressor 102 is only partially loaded. The operation of inlet valve 336 is controlled by solenoid valves SV5 and SV7 which respond to signals from electronic control system 104. Valve SV5, when activated, closes inlet valve 336 and unloads compressor 102. Valve SV7, when activated, partially closes inlet valve 336 so that compressor 102 is only partially loaded. Valve SV7 is connected to a proportional regulator. Thus, when activated, valve SV7 provides closing pressure through the proportional regulator to inlet valve 336 that varies with the pressure in reservoir 312. As system pressure is increased, the amount of closure of inlet valve 336 upon activation of valve SV7 is also increased. Electronic control system 106 is also connected to blowdown valve SV6 which can be activated to release pressure from the system when unloaded and at shutdown.

Figure 2:
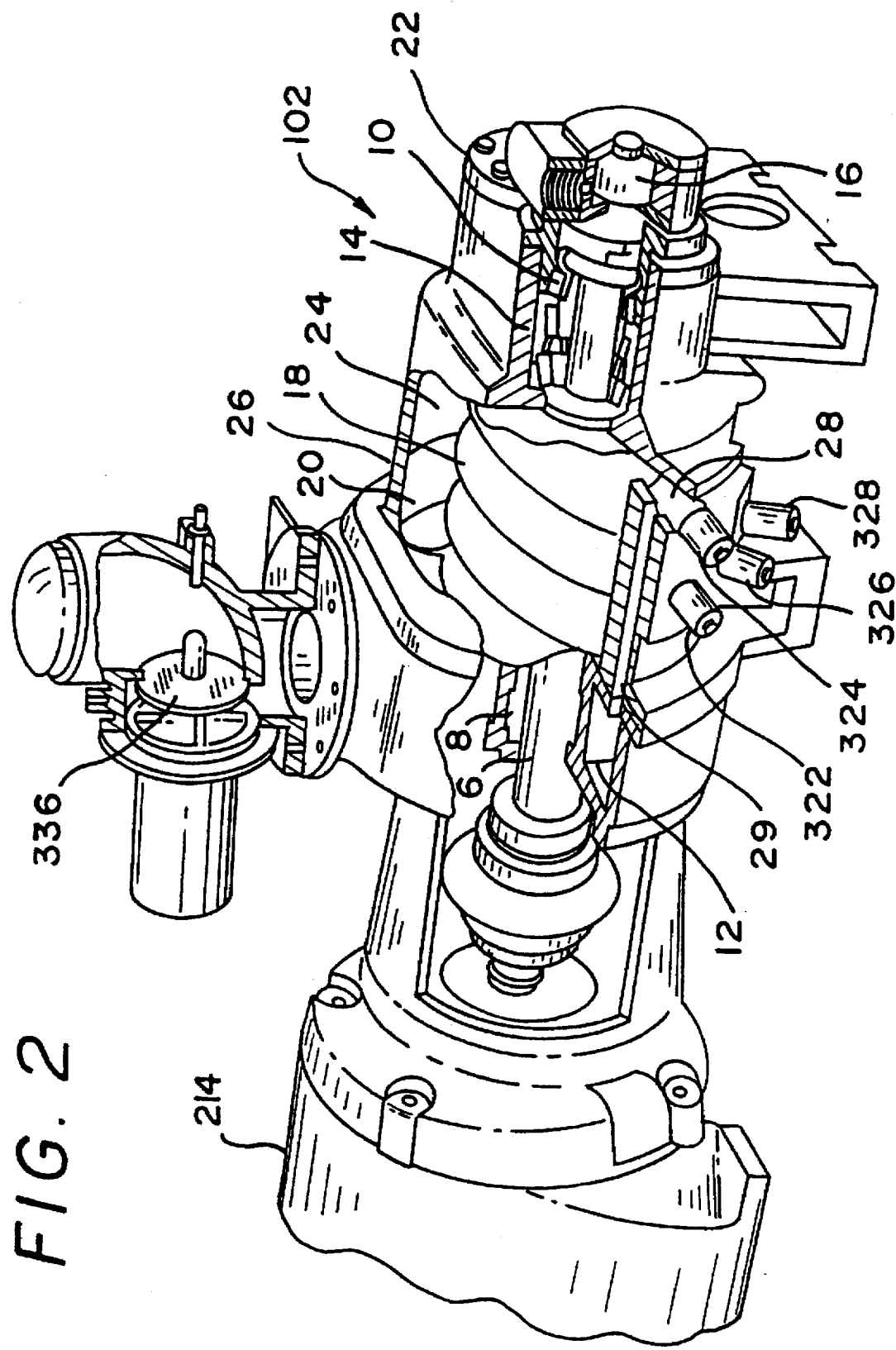
FIG. 2 is a perspective view of a partially cut away screw compressor incorporating valves in accordance with the present invention.

Referring now to FIG. 2, the compressor 102 will now be described in greater detail. Specifically, the compressor 102 is a constant velocity oil flooded rotary screw type compressor which is driven by an electric drive motor 214 which drives the main shaft 6 which is supported by bearing assembles 8 and 10 which are housed in bearing housings 12 and 14 respectively. Positioned at the end of the main shaft 6 is a positive displacement lubricant pump 16 for providing efficient lubricant injection under all operating conditions. Secured to the main shaft 6 is a first rotor 18 while secured to a second rotary shaft (not shown) mounted parallel to shaft 6 includes a second rotor 20. The second shaft is similarly mounted in bearing housing 22. As discussed hereinabove, the screw type compressor includes an inlet valve 336 which controllably moves between a closed position as illustrated in FIG. 2 and a fully opened position when the screw compressor is operating at full capacity. Further, when the screw compressor is operating at less than full capacity, the inlet valve 336 may be positioned somewhere between a fully opened and fully closed position or oscillated between such positions as described in the above-noted copending application.

As discussed hereinabove, lift valves 322, 324, 326 and 328 communicate with the compression chamber 24 formed within the barrel 26 of the compressor 102. As illustrated in FIG. 2, a bore 28 is provided in the barrel 26 which may selectively provide communication between compression nodes and consequently reduces the capacity of the compressor 102. Alternatively, bore 28 may communicate with passage 29 in the barrel housing for returning pressurized fluid to the suction side of the compressor. As discussed hereinabove, when in the open condition, each of these valves act to effectively by-pass a part of the compressor screw and thus reduce the capacity of the compressor by approximately 12.5%. Accordingly, by opening all four valves, the capacity of the compressor is reduced by 50%. It is the structure and process of manufacturing the lift valves 322, 324, 326 and 328 which constitute the essence of the present invention. Accordingly, these valves will be discussed in greater detail hereinbelow.

Figure 3:
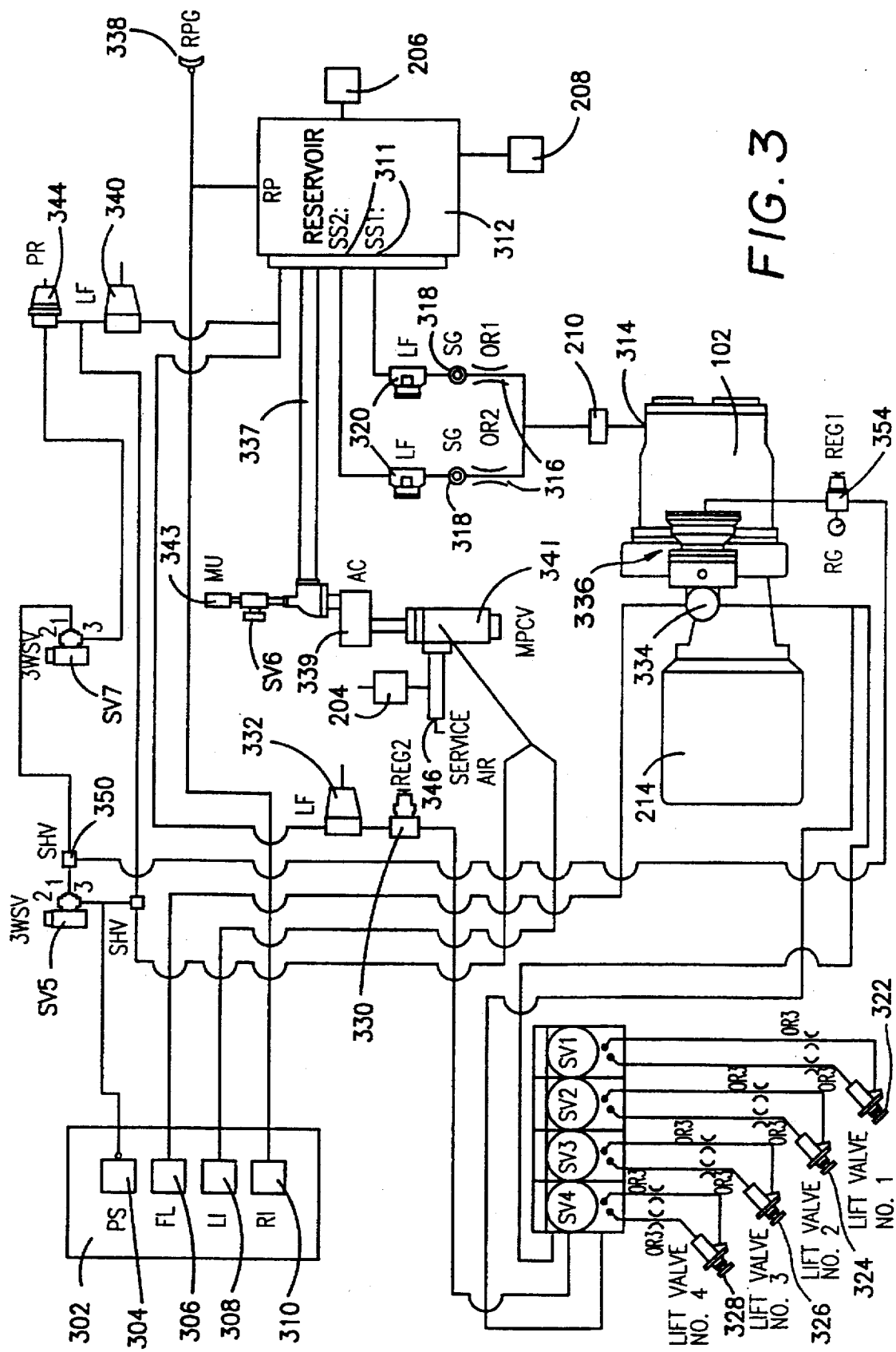
FIG. 3 is a block schematic view of the overall operation of the screw compressor in accordance with the present invention.

FIG. 3 is a block schematic diagram of air control line connections and air control equipment in accordance a preferred embodiment of the invention. Again, this control system is discussed in detail in the above-noted copending application and will be only briefly discussed herein. The air control equipment includes a control panel 302 having a pressure switch 304, an air filter indicator switch 306, a line pressure transducer 308, and a reservoir pressure transducer 310. Separator scavenges 311 of reservoir 312 are connected to air end low pressure point 314 of compressor 102 through line filter orifices 316, sight gauges 318, and line filters 320.

The four way solenoid valves SV1 through SV4 are connected to control lift valves 322, 324, 326, and 328 respectively. Valves SV1 through SV4 are preferably four-way positive action solenoid valves. An air supply input for valves SV1 through SV4 is connected to a pressurized air outlet of reservoir 312 by way of pressure regulator 330 and automatic line filter 332. Pressure regulator 330 may be omitted if the compressor system 100 will not be operated above 125 psi full load pressure. Valves SV1 through SV4 can also be connected by two lines to low pressure point 333 below air filter 334, on inlet valve 336 which is installed on the air intake port of compressor 102. These two lines provide exhaust ports for valves SV1 through SV4, for each direction of stroke of the valves.

The provision of double action lift valves 322, 324, 326, and 328 rather than single action lift valves provides a significant advantage in the context of compressor system 100. This feature will be described in greater detail hereinbelow.

A reservoir air output 337 is connected to reservoir 312 to carry the compressed air output of the compressor to the customer's service air piping system, and thus to the equipment operating on the compressed air generated by compressor system 100. Air output 337 is connected through an after cooler 339 to a minimum pressure check valve 341, the output of which is connected to the customer's service air piping system at service air output 346. Reservoir air output 337 is also connected to a solenoid operated blowdown valve SV6 which is connected to a muffler 343. When blowdown valve SV6 is actuated, air pressure in reservoir 312 is released to the environment through muffler 343.

The pressurized air outlet of reservoir 312 is connected by an air line to reservoir pressure transducer 310, and a mechanical pressure gauge 338 is connected to the same line next to reservoir 312. Similarly, a pressurized air output of reservoir 312 is connected to an input of automatic line filter 340. The output of automatic line filter 340 is connected to one air input side of shuffle valve 342 and to the input of pressure regulator 344. The output of pressure regulator 344 is connected to a non-common connection of three-way solenoid valve SV7. The other air input side of shuffle valve 342 is connected to the customer's service air at service air output 346 of compressor system 100.

The output of shuffle valve 342 is connected to pressure switch 304 and to a non-common connection of three-way solenoid valve SV5. The common connection of three-way solenoid valve SV5 is connected to one air input side of shuffle valve 350. The other air input side of shuffle valve 350 is connected to the common connection of three-way solenoid valve SV7. The remaining non-common connection of each of three-way solenoid valves SV5 and SV7 is open for exhaust. The output of shuffle valve 350 is connected by an air pipe to the input of gauge/pressure regulator 354. The output of gauge/pressure regulator 354 is connected to the inlet valve 336 control side.

These particular air connection configurations and the use of three-way valves SV5 and SV7 are significant because they allow inlet valve 336 to receive operating air pressure more quickly during startup, so that inlet valve 336 can be immediately closed to provide an unloaded startup of compressor 102. At startup, there is no pressure in reservoir 312. There may, however, be pressure in the customer's service air line, due to stored pressure in an external reservoir and/or because other compressors are running to pressurize the service air line. It has been determined that when service air pressure is available, it is advantageous to make use of this pressure for startup control during the period before reservoir 312 is pressurized.

At startup, the existence of pressure in the service air line and the lack of pressure in reservoir 312 will bias shuttle valve 342 to connect the service air line to three-way solenoid valve SV5. Three-way solenoid valve SV5 is then actuated to transmit the service air pressure to shuttle valve 350, while three-way solenoid valve SV7 is controlled to connect its common connection to the exhaust end. The service air pressure biases shuttle valve 350 to connect the service air pressure to control inlet valve 336. Valve SV5 is then actuated, which will unload compressor 102 prior to starting motor 214. In this way, compressor system 100 can be started without any loading, minimizing startup power usage and transient currents. When sufficient pressure is available in reservoir 312, air from reservoir 312 is provided to bias shuttle valve 342 toward three-way solenoid valve SV5, allowing transmission of the reservoir air to the inlet valve 336 control side.

Figure 4:
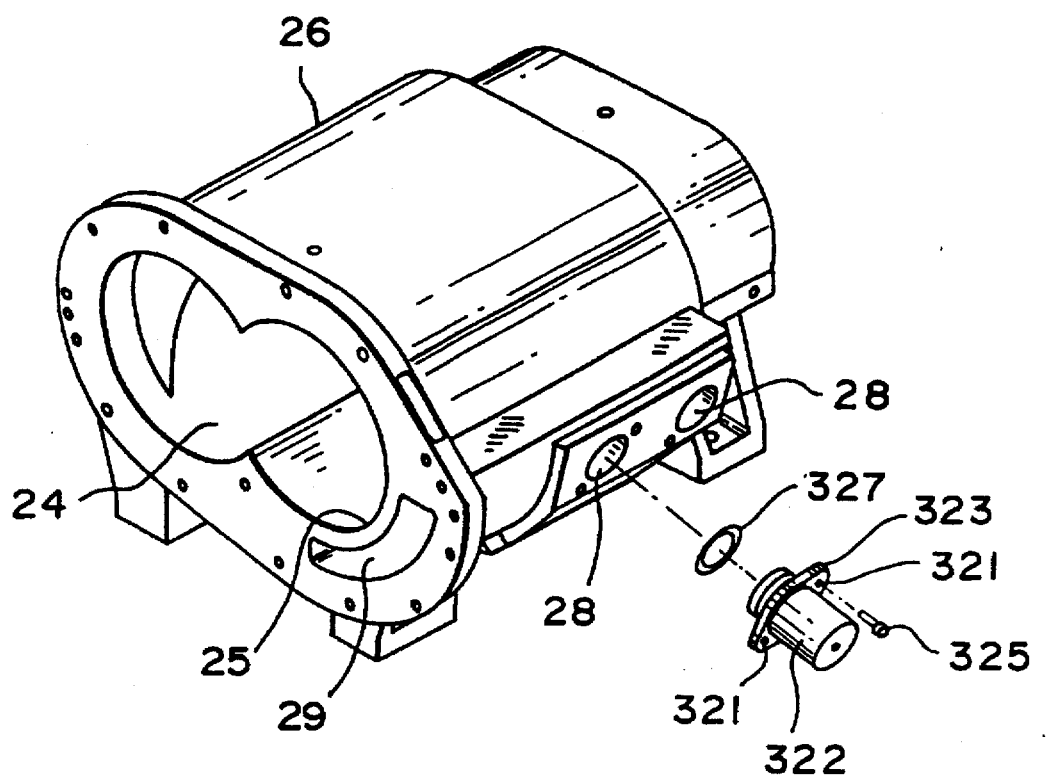
FIG. 4 is a perspective view of a screw compressor housing incorporating the present invention.

Referring now to FIG. 4, the barrel portion 26 of the screw compressor housing is illustrated in detail. The barrel portion 26 is formed by casting and subsequently machined to receive the respective rotors. The barrel wall necessarily takes the shape of two intersecting cylinders, each housing one of the rotors 18 and 20. As discussed hereinabove with respect to FIG. 2, lift valves 322, 324, 326 and 328 of which only lift valve 322 is illustrated communicate with the compression chamber 24 within the barrel 26 by way of bores 28. The double acting lift valve 322 includes a mounting flange 323 which permits the double acting lift valve 322 to be secured to the barrel 26 by way of bolts 325 (one of which is shown). In order to assure proper alignment of the lift valve with the barrel 26, opposed bolt holes 321 in flange 323 as well as the barrel 26 are staggered. By doing so, the lift valve can only be mounted in one orientation. Also provided is a gasket 327 for providing a seal between the barrel 26 and mounting flange 323. The remaining lift valves 324, 326 and 328 are similarly mounted to the barrel 26 in this manner.

In accordance with the present invention and in order to form a more efficient screw compressor, each of the double action lift valves are secured to the barrel 26 in a manner discussed with respect to FIG. 4 and machined along with the machining of the surface 25 of compression chamber 24 within the barrel 26. Referring to each of FIGS. 5, 6 and 7a, it can be noted that the surface 402 which is exposed within the compression chamber 24 of the barrel 26 takes on a concave shape due to its machining along with the machining of the compression chamber 24 of the barrel 26.

Figure 5:
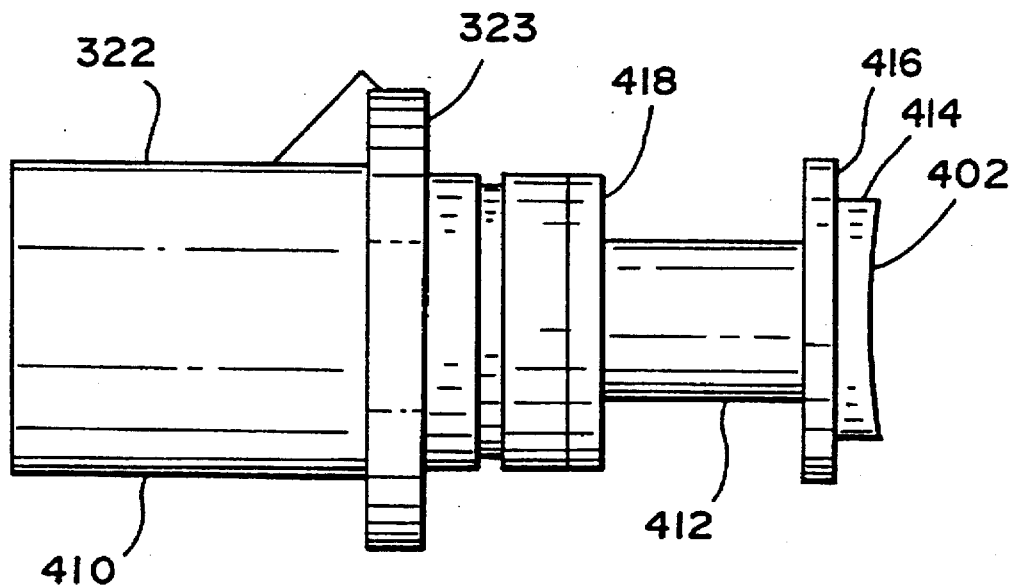
FIG. 5 is an elevational view of the lift valve in accordance with the present invention.

Referring to FIG. 5, the double action lift valve 322 includes a housing 410 which accommodates a piston (not shown) and piston stem 412. Formed integral with the piston stem 412 is a valve element 414 which includes the concave surface 402. Additionally, a flange 416 is provided for positioning the valve against the barrel 26 when the valve is in the fully extended position as illustrated in FIG. 7a. Again, the double action lift valve includes a mounting flange 323 which is cast with the housing 410 for securing the valve in place. In order to seal both pressurized air within the housing 410 as well as sealing out any oil which may leak past the flange 416, a two-way shaft seal 418 is secured to an end of the housing 410. The inner details of the lift valve 322 will now be discussed in greater detail with respect to FIG. 6.

Figure 6:
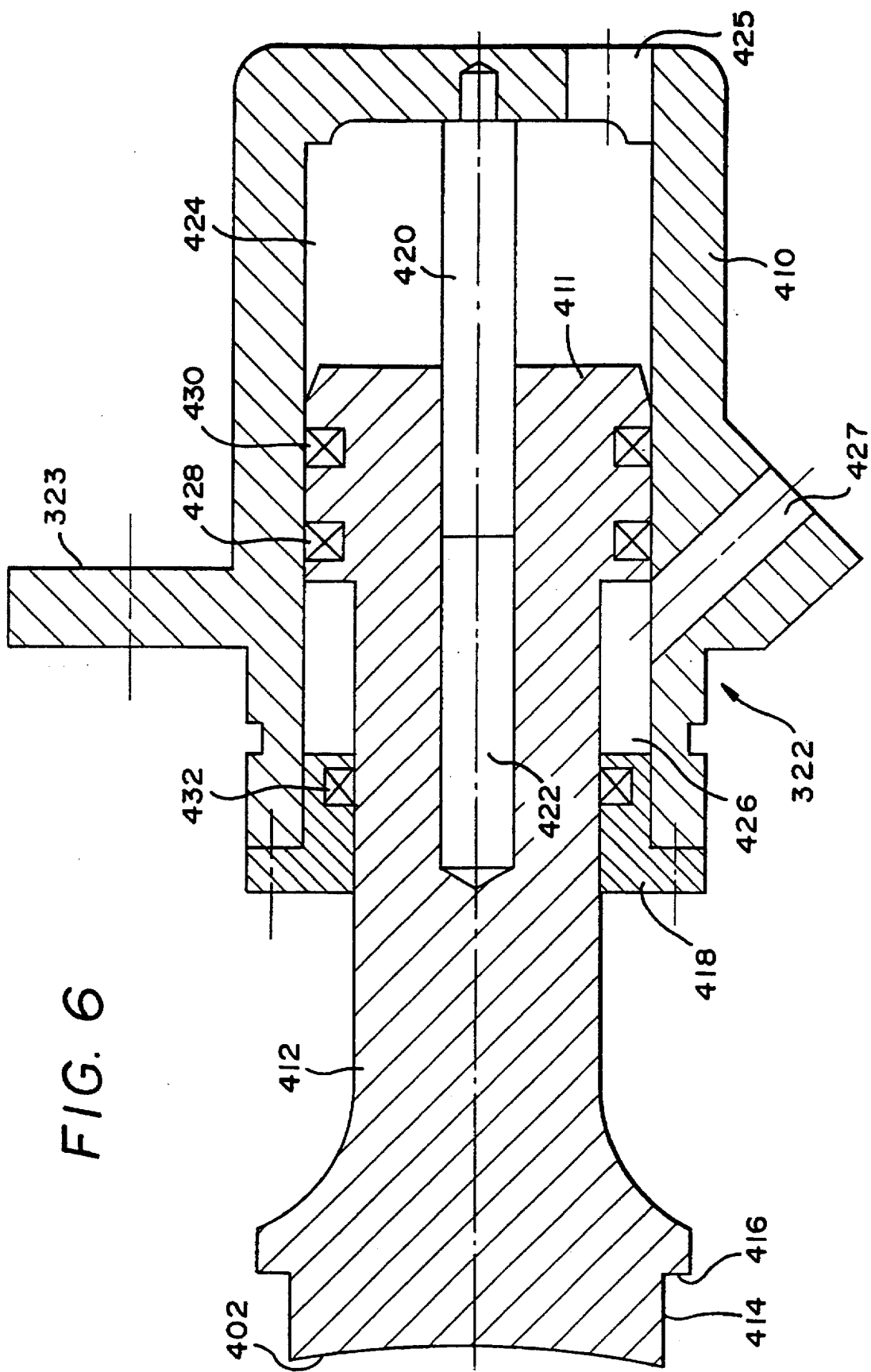
FIG. 6 is a cross-sectional view of a lift valve in accordance with the present invention.
Figure 7A:
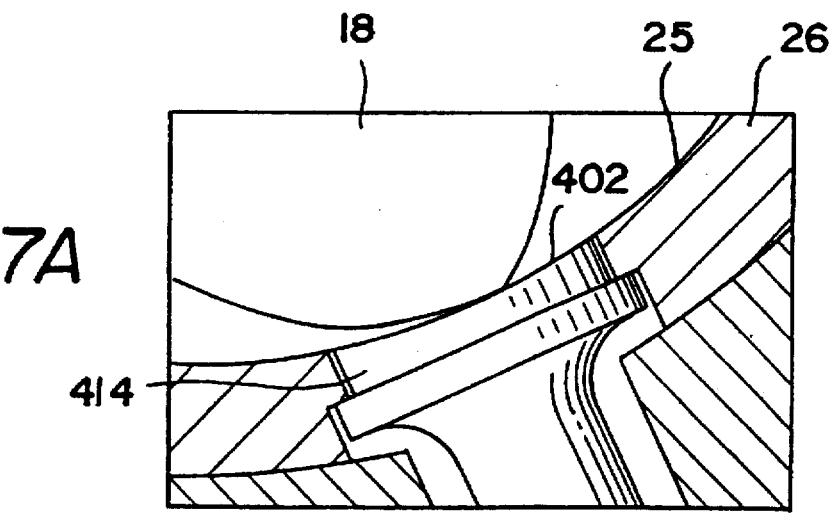
FIG. 7A is a cross-sectional view of the lift valve in accordance with the present invention in operation in the screw compressor housing.

As can be seen from FIG. 6, the piston stem 412 is integrally formed with a piston member 411 which is reciprocally received within the housing 410. The piston stem 412 and piston member 411 may also be separate units secured to one another in any known manner. Further, it should be noted that the housing 410 is in the form of a one-piece cylinder casting. With previous lift valves, the valve casing or housing 410 is formed from multiple sections which are secured to one another using sealing gaskets and the bolts. However, it has been determined by casting a single piece housing, not only are previous leakage points eliminated, the assembly time for assembling the lift valve is also reduced. Further, with the one-piece construction, the flange 323 as well as bolt holes 321 can be so oriented that the lift valve 322 can only be mounted on the barrel in a single orientation thereby eliminating incorrect installation of the lift valves if such valves are removed for shipping or service as referred to hereinabove. Again, it is critical that the lift valves be installed in the orientation in which they are initially manufactured such that the concave surface for 402 is properly oriented within the compression chamber 324. Additionally, in order to assure that the piston 411 and piston stem 412 do not change orientations with respect to the housing 410 after manufacturing, a square pin 414 is received within a square hole 416 formed in the piston 411. In doing so, the square pin 414 will prohibit any rotation of the piston 411 with respect to the housing 410. While the particular embodiment illustrated in FIG. 6 includes the square pin 414 and square hole 416, any mechanism for maintaining the orientation of the piston 411 with respect to the housing 410 may be utilized. The primary concern is to assure the proper orientation of the concave surface 402 within the compression chamber 324. Such an orientation may be maintained by any acceptable means.

When the lift valve 322 is assembled, two pressure chambers are formed, one being pressure chamber 418 between the end of the housing 410 and the piston 411 the other being a second pressure chamber 426 formed between the piston member 411 and the two-way shaft seal 418. Again, as described hereinabove, the two-way shaft seal 418 is provided in order to seal in both directions, that is the two-way shaft seal 418 seals in pressurized air within the pressure chamber 426 and seals out any oil external to the valve.

As discussed hereinabove, each of the lift valves 322, 324, 326 and 328 are actuated and de-actuated by way of fourway solenoid valves SV1, SV2, SV3 and SV4 respectively. That is, in order to manipulate the piston 411 within the housing 410, pressurized air may be provided to either one of pressure chambers 424 or 426 while the other of the pressure chambers are exhausted. That is, in order to force the valve element 414 into the fully extended closed position, pressurized air is provided to the pressure chamber 424 through passage 425 while the pressure chamber 426 is exhausted through passage 427. It should be noted that both passages 425 and 427 are positioned in a lower portion of the valve housing 410. This assures that condensation will be properly drained from the chamber 424 and 426 respectively. Likewise, should it be desired to operate the screw compressor at less than full capacity, pressurized air is supplied to the pressure chamber 426 through passage 427 of one or more of the lift valves while the pressure chamber 424 is exhausted through passage 425 in order to reciprocate the piston 411 and consequently the valve element 414 to an open position. As discussed hereinabove, four way solenoid valves SV1, SV2, SV3 and SV4 are controlled to selectively pressurize and exhaust pressure chambers 424 and 426 in response to a demand placed on the compressor system. In order to isolate the pressure chambers 424 and 426 from one another, piston 411 is provided with seals 428 and 430. Also, seal 432 is provided in the two-way shaft seal which is secured to an open end of the housing 410.

As discussed hereinabove, the surface of the valve element 414 is machined integral with the machining of the surface 25 of the compression chamber 24 of the barrel 26. That is, during the final machining of the compressor chamber side walls 25, in order to form the requisite tolerance between the rotors and such side wall, each of the lift valves 322, 324, 326 and 328 are positioned in their operating position secured to the barrel 26. In this regard, the piston 411 and consequently the valve element 414 must be fully extended and maintained in the fully extended position throughout the machining process and particularly when the surface 402 itself is being machined. In order to do so, the pressure chamber 424 is filled with pressurized hydraulic fluid or oil which assures that the valve element 414 will remain in its fully extended position assuming such fluid to be incompressible. Accordingly, once the lift valves 322, 324, 326 and 328 are secured to the barrel 426, pressure chamber 424 is filled with an incompressible fluid at which time the final machining of the wall 25 of the compression chamber 24 is carried out. In doing so, the surface 402 of the valve element 414 exactly matches and forms a continuation of the wall 25 of the compression chamber 24 which minimizes any leakage around the rotor as the rotor passes over the surface 402.

Figure 7B:
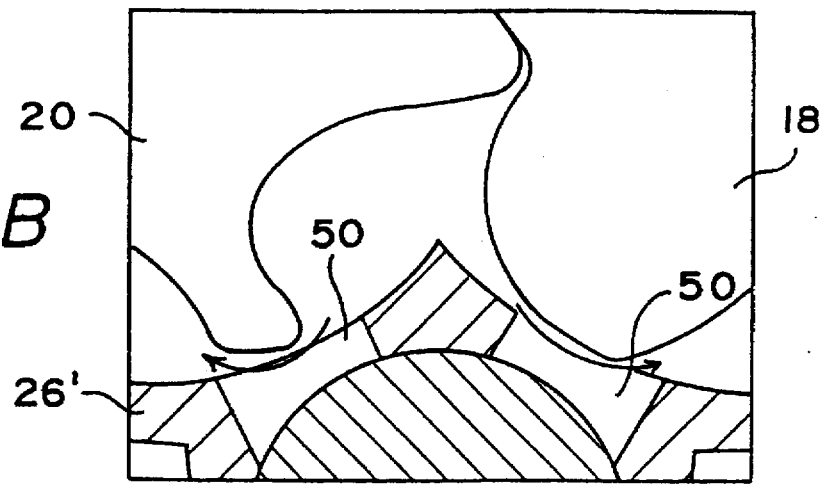
FIG. 7B is a cross-sectional view of a prior art spiral or turn valve in operation in the screw compressor housing.
Figure 7C:
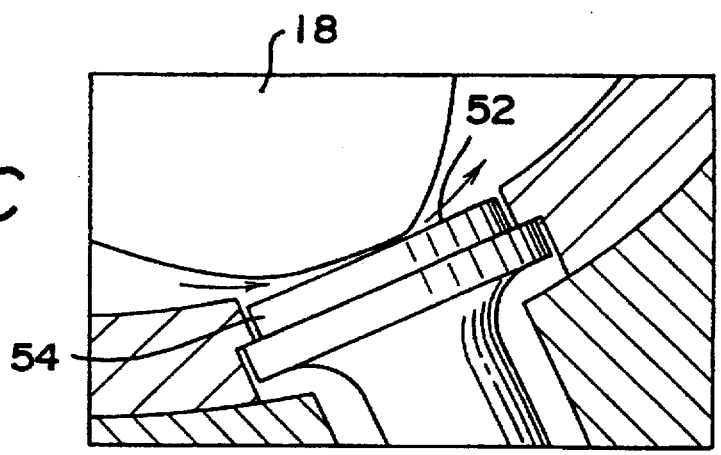
FIG. 7C is a cross-sectional view of a prior art lift valve in operation in the screw compressor housing.

Referring now to FIGS. 7A through 7C, the distinct advantage of the present invention over prior art valving systems will become clearly apparent. The present invention is illustrated in FIG. 7a wherein the valve element 414 is positioned in its fully extended position. As can be seen from FIG. 7A, the surface 402 of the valve element 414 forms a continuation of the surface 25 of the compression chamber 24 of barrel 26. Accordingly, as rotor 18 rotates past the valve element 114, there is no leakage between the surface 402 of the valve element 414 and the rotor 18. This is achieved because the surface 402 is machined integral with the surface 25 of the barrel 26. Further, the positioning of the valve element 414 is assured due to the positive displacement of the piston within the double acting lift valve. While the aforementioned prior art devices illustrate lift valves having concave surfaces, such lift valves are formed by way of a separate manufacturing process and subsequently positioned within the compressor housing. Accordingly, these lift valve surfaces are manufactured to within predetermined tolerance, however, such manufacturing process cannot practically duplicate the curvature of the compression chamber surface 25 and thus leakage by the rotor may still exist in such systems.

Referring to FIG. 7B, clearly when using a turn and spiral valve variable capacity design, numerous ports 50 are provided near the bottom center line of the barrel 26'. As discussed hereinabove, these ports are as deep as the housing material is thick and consequently air in the higher pressure compression pocket blows around the tips of the rotors 18 and 20 as they pass these ports. Clearly, the efficiency of the device is significantly reduced and full capacity cannot be achieved.

The poppet type valve illustrated in FIG. 7C includes a planar surface 52 on the valve element 54 which also allows blow by around the rotor 18 resulting in a reduction in the efficiency of the system. Further, such a poppet type valve relies on a single acting piston to close the valves, thereby relying on the internal air pressure and/or a spring force to move, the valve to the open position. Often times, the opening pressure may be low and consequently these valve designs may stick or operate erratically, again failing to provide the user with the maximum savings under part load conditions.

Clearly, it can be seen that by utilizing double acting lift valves having a single valve cylinder casting with a valve element which is machined in conjunction with the machining of the compression chamber wall provides an advantageous capacity control system wherein the compressor can realize 100% efficiency when the double acting lift valves are in the closed position and which may accrately control the capacity reduction as desired.

While the present invention has been described with reference to referred embodiments, it will be appreciated by those skilled in the art that the invention may be practiced otherwise than as specifically described herein without departing from the spirit and scope of the invention. Therefore, it will be understood that the spirit and scope of the invention be limited only by the appended claims.

What is claimed:

1. A method of manufacturing a lift valve for use in a variable capacity screw compressor comprising the steps of:
   securing at least one lift valve to a housing of the variable capacity screw compressor in an operating position, said lift valve including a valve housing, a shaft extending from and reciprocally received within said valve housing and a valve face seethed to a remote end of said shaft;
   fully extending said shaft from said valve housing;
   maintaining said shaft in said fully extended position, and simultaneously machining an inner surface of said compressor housing and said valve face;
   wherein said valve face forms a continuation of said compressor housing when said variable capacity screw compressor is operating at full capacity.

2. The method as defined in claim 1, further comprising the step of maintaining an angular orientation of said valve face with respect to said valve housing during said machining step.

3. The method as defined in claim 1, wherein said step of maintaining said shaft in said fully extended position includes pressurizing at least one chamber within said valve housing.

4. The method as defined in claim 3, wherein said chamber is pressurized with a substantially incompressible fluid.

5. The method as defined in claim 3, wherein said incompressible fluid is oil.

6. The method as defined in claim 1, wherein a plurality of lift valves are secured to said housing prior to said step of machining said inner surface of said compressor housing.

* * * * *